(12) United States Patent
Ispolatova et al.

(10) Patent No.: US 8,192,313 B2
(45) Date of Patent: Jun. 5, 2012

(54) PLATE FOR A ROCKER JOINT CHAIN

(75) Inventors: Olga Ispolatova, Bühl (DE); Johannes Hüttinger, Rosbach (DE); André Teubert, Bühl (DE); Wolfgang Dilger, Seelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 575 days.

(21) Appl. No.: 12/317,242

(22) Filed: Dec. 18, 2008

(65) Prior Publication Data

US 2009/0181816 A1 Jul. 16, 2009

Related U.S. Application Data

(60) Provisional application No. 61/008,024, filed on Dec. 18, 2007.

(51) Int. Cl.
*F16G 13/02* (2006.01)

(52) U.S. Cl. ........................................... 474/229

(58) Field of Classification Search ................ 474/201, 474/206, 213, 214, 215, 216, 228, 229, 230, 474/245, 219, 220, 221, 223, 224
See application file for complete search history.

(56) References Cited

U.S. PATENT DOCUMENTS

| 5,154,674 A | 10/1992 | Avramidis et al. ............ 474/214 |
| 5,393,272 A * | 2/1995 | Okuwaki et al. .............. 474/213 |
| 6,478,704 B1 * | 11/2002 | Greiter .......................... 474/215 |
| 6,558,281 B1 * | 5/2003 | Greiter .......................... 474/219 |
| 6,824,484 B2 * | 11/2004 | Greiter .......................... 474/201 |
| 7,357,742 B2 * | 4/2008 | Wagner et al. ................ 474/215 |
| 2005/0202915 A1 * | 9/2005 | Pichura et al. ................ 474/215 |
| 2005/0209035 A1 | 9/2005 | Oberle et al. ................. 474/206 |
| 2007/0161446 A1 * | 7/2007 | Penner .......................... 474/215 |
| 2007/0298922 A1 * | 12/2007 | Triller et al. .................. 474/215 |
| 2008/0176692 A1 * | 7/2008 | Teubert ......................... 474/214 |

FOREIGN PATENT DOCUMENTS

| DE | 41 13 370 A1 | 10/1991 |
| DE | 197 43 676 A1 | 4/1998 |
| DE | 103 16 441 A1 | 11/2003 |
| EP | 1 902 792 A2 | 3/2008 |
| JP | 61082042 A | 4/1986 |
| JP | 10122307 A | 5/1998 |
| WO | WO 2007/065406 A1 | 6/2007 |
| WO | WO 2008/069319 A1 | 6/2007 |

* cited by examiner

*Primary Examiner* — William A Rivera
(74) *Attorney, Agent, or Firm* — Alfred J. Mangels

(57) ABSTRACT

A plate for a rocker joint chain in which the plate includes two longitudinal legs and two vertical legs that together enclose a plate opening. The plate includes at least one recess in a longitudinal leg to replace a tab that extends from a longitudinal leg in previously employed plates. A guide rail along which the rocker joint chain travels to reduce slack strand vibrations during chain movement is subject to less wear than with the previously employed plates.

15 Claims, 5 Drawing Sheets

PLATE FOR A ROCKER JOINT CHAIN

BACKGROUND OF THE INVENTION

1. Field of the Invention

The present invention relates to a plate for a rocker joint chain, wherein the plate includes two longitudinal legs and two vertical legs that together enclose a plate recess.

2. Description of the Related Art

A known rocker joint chain is disclosed in published German patent application DE 103 16 441 A1. That chain has sequentially arranged plates in a plurality of adjacent rows perpendicular to the direction of chain travel, and the plates in adjacent rows partially overlap and are connected by rocker members that extend into the plates in the direction perpendicular to the direction of chain travel. Two pairs of rocker members extend through a recess in each plate, and the outermost rocker members that face away from each other abut the front and rear inside surfaces of the plate recess. The innermost rocker members that face each other abut the front and rear inside surfaces of the recesses of adjacent plates. The facing surfaces of the rocker members of a rocker member pair roll against each other when the rocker joint chain transitions from a straight, extended form to a curved form. Such rocker joint chains are used in a variable speed drive unit of a belt-driven conical-pulley transmission, a so-called continuously variable transmission (CVT), for example.

The plates include tabs that are used to help assemble the rocker joint chain, and the tabs contact a guide rail of the CVT transmission in the event of strand vibration. Such guide rails are provided to limit the transverse vibrations of the rocker joint chain. As the torque increases, the strand vibrations increase in the CVT transmission. As a result, the tabs cause pitting in the guide rail when the transverse vibrations are high.

Guide rail wear also reduces the useful life of the rocker joint chain. An object of the present invention is therefore to provide plates that cause less wear of the chain guide rail in comparison with prior art plates.

SUMMARY OF THE INVENTION

Briefly stated, the object is achieved with a plate for a rocker joint chain in which the plate includes two longitudinal legs and two vertical legs that together enclose a plate recess, wherein at least one recess is provided in at least one of the longitudinal legs. The purpose of the recess is similar to that of the previously used tabs, which is to help orient the plates when assembling the rocker joint chain. Instead of two downwardly extending tabs, one or a plurality of recesses are provided in the plate. That greatly increases the contact surface area between the outer contour of the plate and the guide rail. The recesses can be in both of the bottom and top longitudinal legs of the plate. Depending upon the method of assembly, both longitudinal legs (top and bottom) can be provided with recesses.

At the recess, the longitudinal leg preferably has a height "b" with reference to a baseline, and the recess has a depth "a" with reference to the baseline, wherein the ratio $$0.1 \leq \frac{a}{b} \leq 0.5$$

applies. Furthermore, the ratio is preferably $$\frac{a}{b} = \frac{1}{5}.$$

The baseline is a straight line that extends over the recess in the longitudinal leg. The baseline therefore corresponds to the outer edge surface of the longitudinal leg of the plate before the recess is formed, when it is formed by cutting, for example.

It is preferable for the recess in the longitudinal profile of the plate to be trapezoidal or rectangular. The recess in the longitudinal profile of the plate is preferably trapezoidal with rounded corners or rectangular with rounded corners. The term "trapezoidal" is hence also understood to be a shape of the recess in which a trapezoid can be inserted so that it contacts in the contour of the recess at a plurality of points, at least three. The expression "rounded corners" is especially understood to mean contours that have smooth transitions between differently curved surfaces.

The recess is preferably formed by adjacent convex and concave curves that smoothly transition into each other and form a generally trapezoidal or rectangular recess. In one variation, concave curves joined by a section of a straight line are arranged on both sides of an axis of symmetry. The convex or concave curves are preferably defined by radii, and the radii can be equivalent. The recess in the longitudinal profile of the plate can alternately be shaped like a section of circle or the section of an ellipse.

In one embodiment of the invention, the recess is approximately in the middle relative to a centerline of the plate. In another embodiment, a plurality of recesses are arranged in a longitudinal leg, wherein the recesses are preferably arranged symmetrically relative to a centerline of the plate.

The earlier-identified object is also achieved with a rocker joint chain that at least partially includes plates having the configuration described above.

The earlier-identified object is also achieved with a variable speed drive transmission having a plate-link chain according in accordance with the present invention, wherein the recesses in the plates are on the side of the plates that are guided past a guideway of a guide rail during operation.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
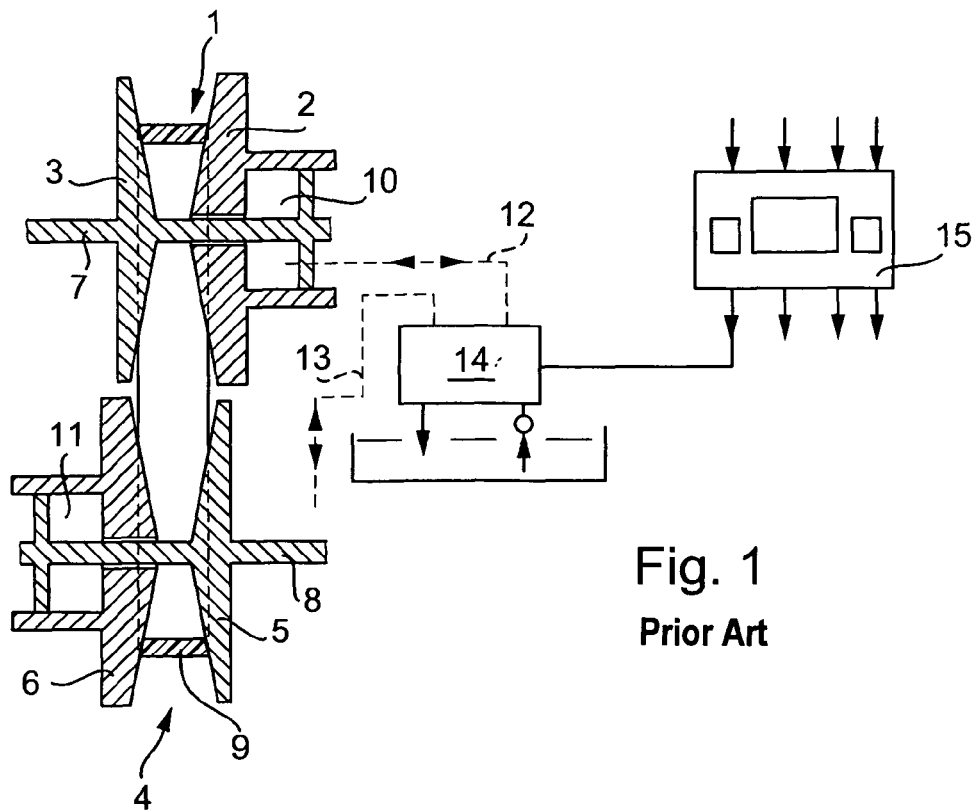
FIG. 1 is a schematic representation of a known belt-driven conical pulley transmission with an associated control unit.

A state-of-the-art variable speed drive transmission and rocker joint chain are explained with reference to FIGS. 1 to 4 to provide a better understanding of the present invention and to illustrate the concepts that are applied. The variable speed drive transmission (a belt-driven conical-pulley transmission) includes two pairs of conical disks 1 and 4. Conical disk 2 of conical disk pair 1 is rigidly connected to a drive shaft 7 that is driven by an internal combustion engine, for example. Conical disk 5 of the other conical disk pair 4 is rigidly connected to an output shaft 8 that drives the vehicle. The other conical disk 3 of the conical disk pair 1 is non-rotatably but axially movably connected to drive shaft 7. The other conical disk 6 of the conical disk pair 4 is non-rotatably but axially movably connected to output shaft 8. Passing around both conical disk pairs 1 and 4 is endless-torque transmitting means 9, a rocker joint chain as shown in FIG. 3, for example, that frictionally engages the facing conical surfaces of the conical disk pairs. As a result of opposite adjustment of the axial spacing between the two conical disks of each conical disk pair the speed ratio between the two conical disk pairs can be changed, and hence the transmission ratio of the transmission.

To change the transmission ratio, pressure chambers 10 and 11 are connected by means of hydraulic lines 12 and 13 to a control valve unit 14 that can control the hydraulic fluid pressure supplied to the pressure chambers 10 and 11. To control the control valve unit 14, a control unit 15 is used that contains a microprocessor with associated memory devices, and its inputs are connected to a selector lever unit to actuate the transmission, a gas pedal, and speed sensors, for example, and its outputs are connected to a clutch, a power controlling element of the engine (not shown), and the control valve unit 14, for example. The design and operation of such a belt-driven conical-pulley transmission are known and therefore will not be described further.

Figure 2:
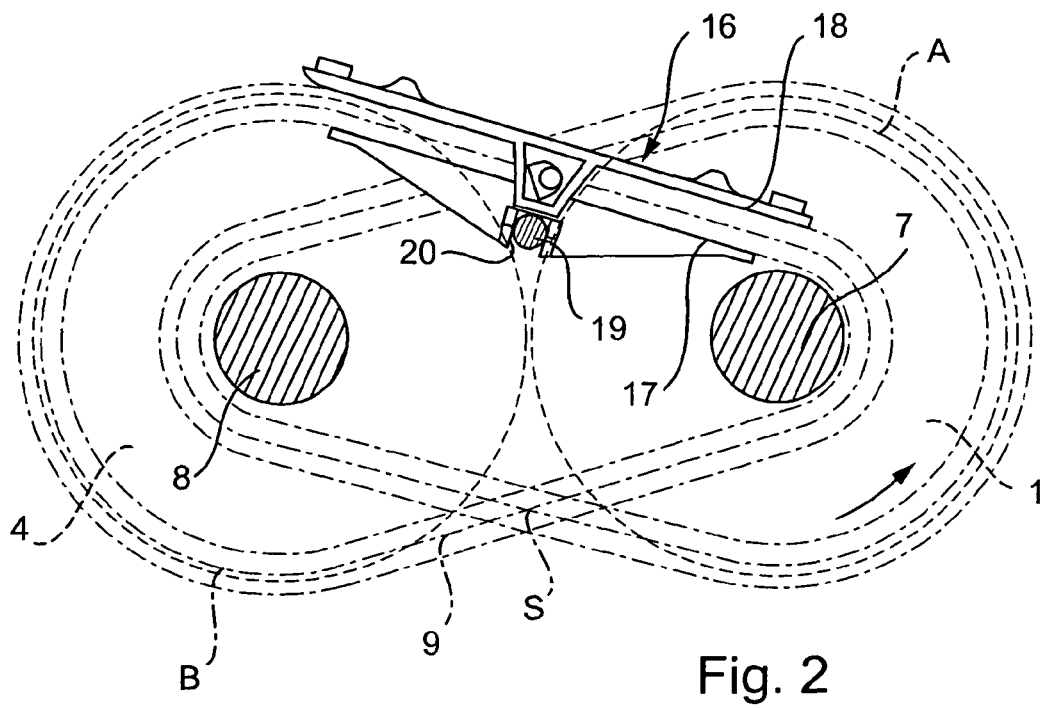
FIG. 2 is a cross-sectional view perpendicular to the axes of a known belt-driven conical pulley transmission.
Figure 3:
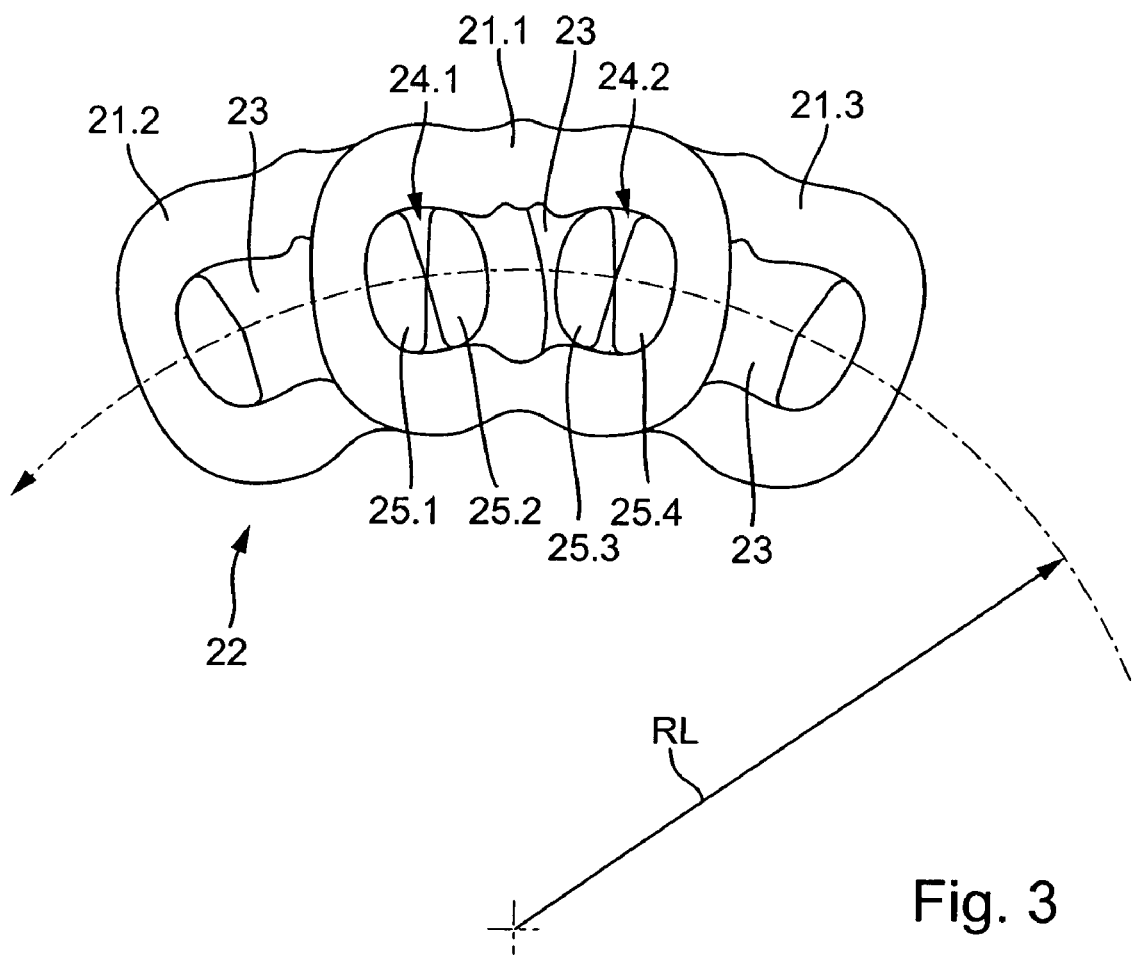
FIG. 3 is a side view of a portion of a rocker joint chain.

FIG. 2 shows a cross-sectional view perpendicular to the axes of shafts 7 and 8 through a belt-driven conical-pulley transmission, in which the slack strand of the endless torque transmitting means 9 is guided by a guide rail 16 that prevents the slack strand from vibrating. In the illustrated example, the direction of rotation of the disk pairs 1 and 4 is counter clockwise, and 7 is the drive shaft driven by the engine. The belt-driven conical-pulley transmission or its endless-torque transmitting means 9, represented by dashed lines, is shown in two different positions. In one position A, the distance between the conical disks of the conical disk pair 1 is the minimum, and the distance between the conical disks of conical disk pair 4 is the maximum, so that the transmission operates at the highest possible transmission ratio. In another position B, the spacings between the respective disk pairs are reversed relative to those of position A, the transmission operates at the lowest possible transmission ratio, and the radius at which the endless-torque transmitting means circulates on the conical disk pair 4 is the maximum radius.

The guide rail 16 that guides the endless-torque transmitting means 9 between an outer guideway 18 and inner guideway 17 is mounted on a pin or oil pipe 19 that is affixed to the transmission housing (not shown). Guide rail 16 includes a substantially U-shaped seat 20 whose opposed side walls are approximately perpendicular to the direction of movement of the endless-torque transmitting means, or the longitudinal direction of the guide rail. Seat 20 is so formed that the guide rail follows the change of the path of movement of the endless-torque transmitting means 9 by pivoting on the oil pipe 19, and by the movement of the opposed walls of the seat 20 on the outer surfaces of the oil pipe 20, so that the loose strand of the endless-torque transmitting means is always securely guided and is secured against vibration. The oil pipe 19 has radial holes through which (and through corresponding recesses in the floor of the seat 20) the inside of the guide rail 16 is supplied with lubricant to lubricate the endless-torque transmitting means so that it is movable along the guide rail 16 with reduced friction.

FIG. 3 shows a portion of a rocker joint chain 22 that is composed of plates 21 that are connected with each other by means of rocker members 25. The plates 21 are sequentially arranged in a plurality of longitudinally-extending rows that are adjacent relative to the direction of travel of the rocker joint chain 22. In FIG. 3 plate 21.1 belongs to the front row in the viewing direction, plate 21.2 belongs to the row neighboring the front row, and plate 21.3 belongs to another row.

To connect the plates, rocker members 25 are provided that extend into the plate openings 23 in a direction perpendicular to the direction of chain travel. Each plate opening is penetrated by two rocker member pairs 24.1 and 24.2, wherein plates 21.1 and 21.2 are associated with rocker member pair 24.1, and plates 21.1 and 21.3 are associated with rocker member pair 24.2. As can be seen, the oppositely facing surfaces of the rocker members 25.1 and 25.4 facing away from each other of rocker member pairs 24.1 and 24.2 abut the front and rear inside surfaces, with reference to the direction of travel of the rocker joint chain 22, of the plate opening 23. The rocker members 25.2 and 25.3 that face each other abut the insides of plate openings in plates that are in neighboring rows. The facing surfaces of the rocker members of each rocker member pair form rolling surfaces at which the rocker members roll against each other given a change in the radius RL with which the respective portion of the rocker joint chain 22 curves.

Such a rocker joint chain 22 and the associated variable speed drive unit in FIG. 1 and FIG. 2, with two conical disk pairs around which the rocker joint chain 22 circulates, are known and will therefore not be further described.

Figure 4:
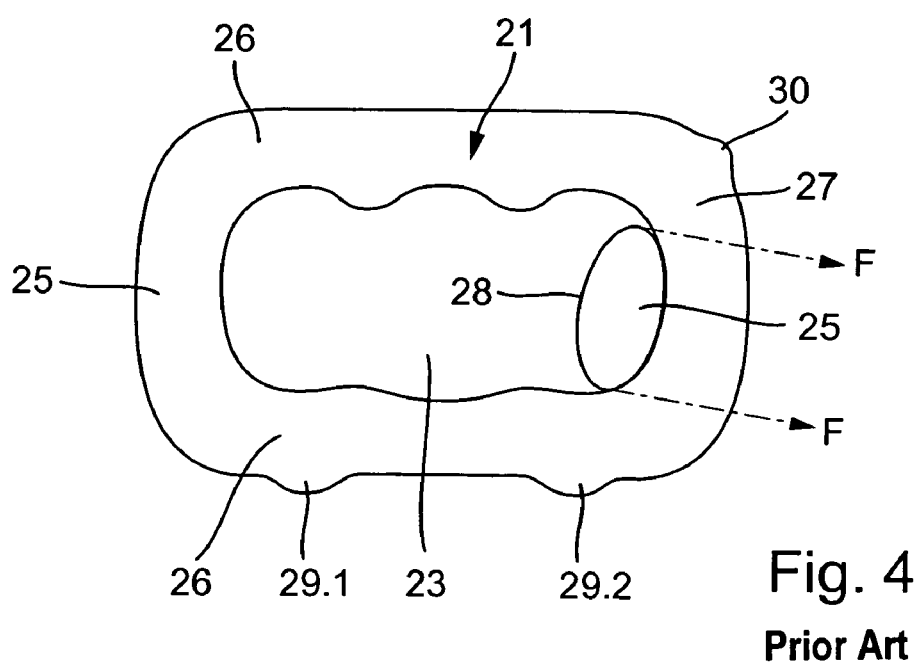
FIG. 4 is an enlarged side view of a plate and rocker member.

FIG. 4 shows an enlarged prior art plate 21 and a rocker member 25. The rocker member 25 has two longitudinal legs 26 and two vertical legs 27 that together enclose the plate opening 23. In FIG. 4, the rocker member 25, whose rolling surface is identified as 28, contacts the right side inner surface of the plate opening 23, wherein the respective contact surfaces are adapted to each other such that contact only occurs at the transitions from the longitudinal legs 26 to the vertical legs 27, and there is no contact in the middle of the vertical leg 27. When the plate 21 in FIG. 4 moves from right to left, a force corresponding with the force that is transmitted by the rocker joint chain 22 is transmitted to the contact surfaces, which force is indicated in the figure by the arrows F, which show the direction of the force. As a result of shifting the force application points toward the middle of the longitudinal legs, both tensile stresses and bending stresses act in the longitudinal legs 26. Likewise, bending stresses and tensile stresses also act in the vertical legs.

The plate 21 includes tabs 29 on at least the outside of one of the longitudinal legs 26. The tabs are identified in this instance by reference numerals 29.1 and 29.2. The tabs 29 contact the inner guideway 17 or the outer guideway 18 when the strand of the rocker joint chain 20 vibrates, which causes pitting. Pitting involves the formation of micro-fissures close to the surface from the impacts of the tabs 29 on the surface of the guideway 17 or 18. A stop tab 30 limits the maximum angular deflection of the plate-link chain, that is, radius RL in FIG. 4, because the stop tab contacts a neighboring plate.

Figure 5:
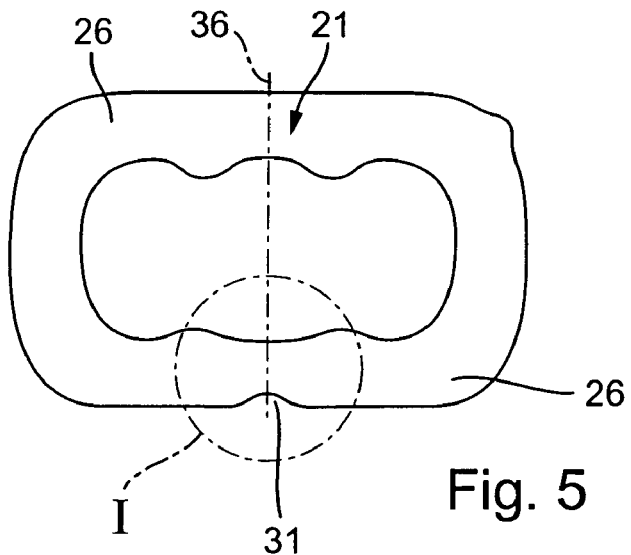
FIG. 5 is a side view of a first exemplary embodiment of a plate in accordance with the present invention.
Figure 6:
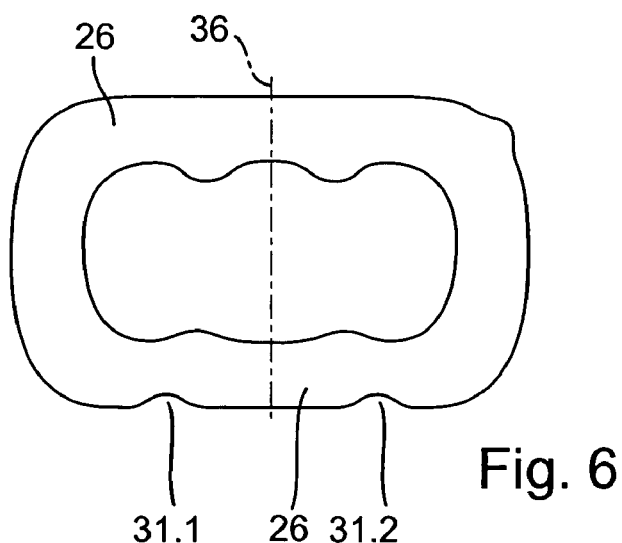
FIG. 6 is a side view of a second exemplary embodiment of a plate in accordance with the present invention.

FIGS. 5 and 6 show exemplary embodiments of a plate in accordance with the invention that has one or two recesses 31 instead of the tab 29. In the exemplary embodiment shown in FIG. 5, a recess 31 is in the middle of the plate 21; the middle of the plate 21 is indicated by a centerline 36. FIG. 6 shows a second exemplary embodiment of a plate in accordance with the present invention that includes two recesses, identified by reference numerals 31.1 and 31.2, which are on each side of the centerline 36. When a plate in accordance with the present invention contacts one of the guideways 17 or 18, the contact surface area is substantially larger than with the prior art plate because a large part of the surface of the respective longitudinal leg 26 contacts the guideway 17 or 18, instead of individual tabs having a very small contact surface as in the prior art plates.

The recesses 31 can be provided in the bottom or top longitudinal leg 26. The bottom longitudinal leg refers to the inner side of the rocker joint chain 22 when the rocker joint chain 22 is installed and encircles a conical disk pair, and the top longitudinal leg 26, correspondingly, refers to the outer side of the rocker joint chain 22 when a conical disk pair is encircled.

Figure 7:
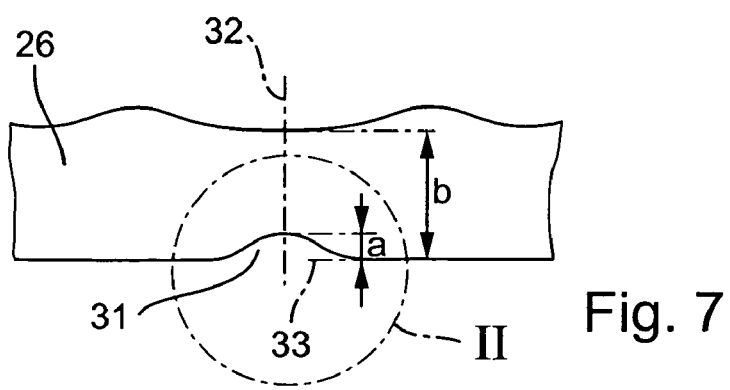
FIG. 7 is an enlarged, fragmentary view of detail I of FIG. 5.

FIG. 7 shows detail I of FIG. 5. The region of the recess 31 is shown in an enlarged view. At an axis of symmetry 32, which in this case coincides with the centerline 36, the longitudinal leg 26 has height "b" with reference to a baseline 33. The baseline represents the outer contour of the longitudinal leg 26 that spans the recess 31. The baseline 33 can be most easily represented as a straight line that tangentially contacts any two points of the longitudinal leg 26, as if the plate 21 was placed on a flat panel. The depth of the recess 31 with reference to the baseline 33 is shown in FIG. 7 as depth "a." The following applies for the relationship between values "a" and "b": $0.1 \leq a/b \leq 0.5$. In a preferred embodiment, a:b=1:5.

Figure 8:
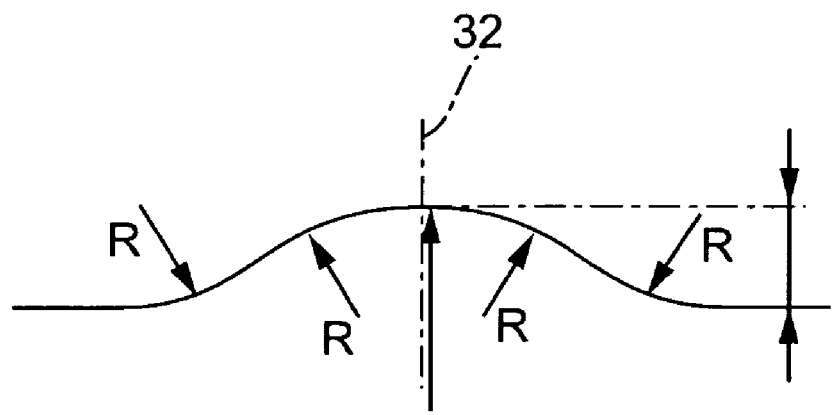
FIG. 8 is an enlarged, fragmentary view of detail II of FIG. 7.

FIG. 8 shows detail II of FIG. 7 as a further enlarged representation of recess 31. The recess shown in FIG. 8 is one possible exemplary embodiment of the form of the recess. The basic shape of the recess 31 is in the general form of a trapezoid 34, shown as a dot-dashed line in FIG. 9. The angles at the corners of the generally trapezoidal recess are curved corners that are approximated by tangential circles. For example, in FIG. 9 two tangential circles K1 and K2 are shown that each tangentially contact the sides of trapezoid 34 at two points. For circle K1, those points are points T1 and T2, and for circle K2 those points are points T2 and T3. In that manner, the trapezoidal shape is approximated by a series of circle segments that define circular arcs.

Figure 9:
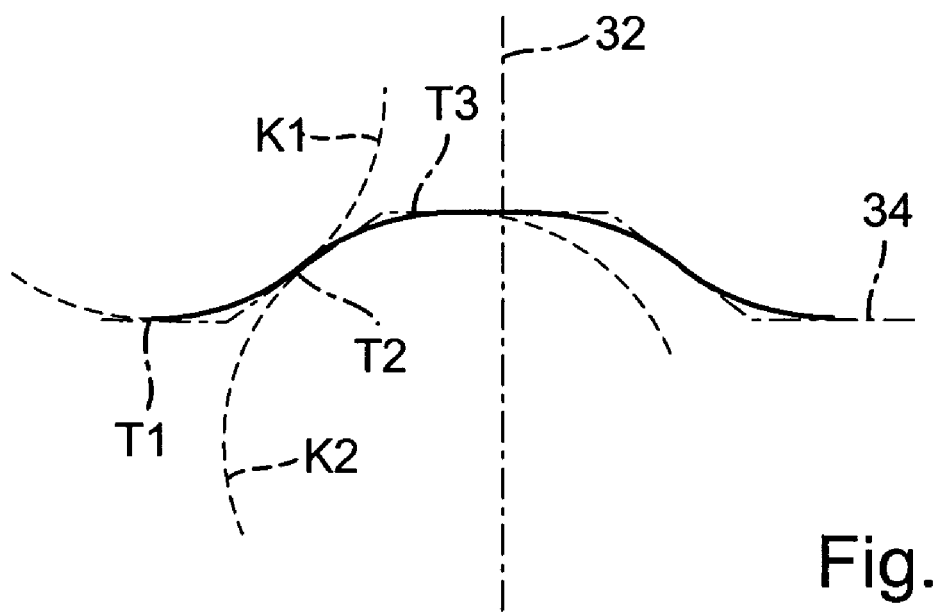
FIG. 9 is an enlarged, fragmentary view showing the form of the construction of the contour of the recess shown in FIG. 8.

In the representation in FIG. 9, the two straight sections between points T1 and T2 are replaced by the circular arc that is a circle segment of circle K1, and is represented by a continuous line. Correspondingly, the two straight sections abutting each other between points T2 and T3 are replaced by the corresponding circular arc that is a circle segment of circle K2. In the present exemplary embodiment, the radii of circles K1 and K2 are identical, and in FIG. 8 that is indicated by the same identification of the radii R. Alternatively, those radii can also be different. The forms of the contours contacting the trapezoid 34 are symmetrical to an axis of symmetry 32. The circle segments lying to either side of the centerline 36 (in FIG. 9, one of those segments is the circle segment that is part of circle K2) are thereby connected by a section of a straight line to yield the contour shown in FIG. 8.

Figure 10:
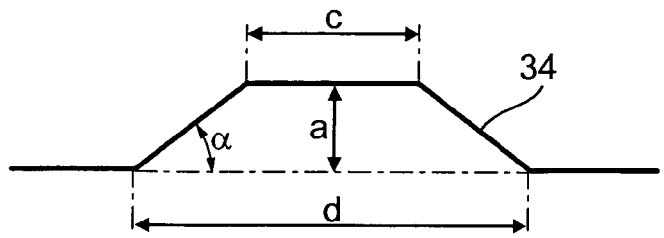
FIG. 10 is a first sketch showing the length relationships of one form off the recess.

FIG. 10 shows the geometric relationships of the lengths of individual sections of the trapezoid 34 shown in FIG. 9. The height of trapezoid 34 is identified by line "a" in FIG. 9, which corresponds to the depth "a" of the recess 31 shown in FIG. 7, and the lengths of the lines "c" and "d", and the opening angle α of the leg. For the relationship between those values the following applies:

$$\arctan\left(\frac{2 \cdot a}{d-c}\right) \leq \alpha \leq 90°.$$

Figure 11:
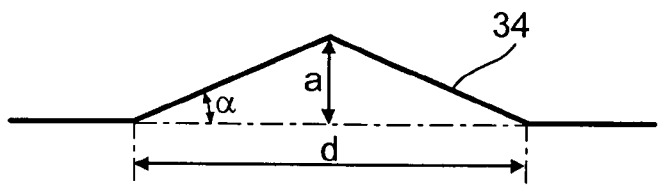
FIG. 11 is a second sketch showing the length relationships of another form of the recess.
Figure 12A:
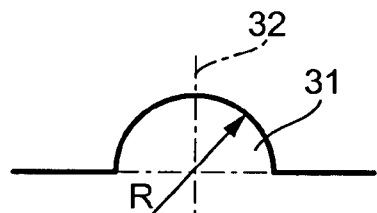
FIGS. 12a-12e show various alternative exemplary embodiments of the form of the recess.
Figure 12B:
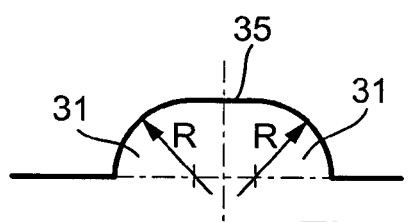
Figure 12C:
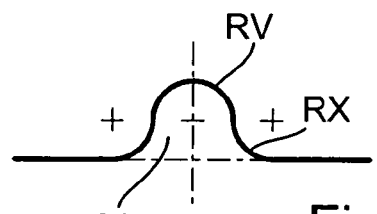
Figure 12D:
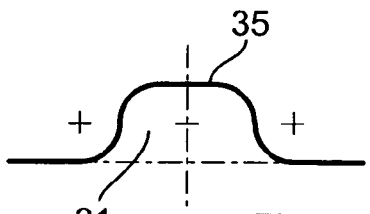
Figure 12E:
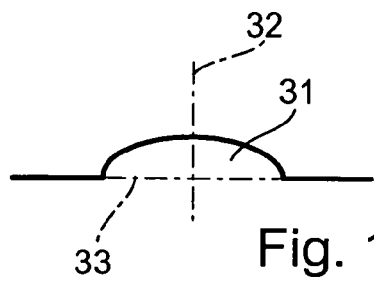

FIG. 11 shows an exemplary embodiment of the construction of the contour of the recess 31 on the basis of a triangular section. In that case as well, the quantity "a" indicates the depth of the recess 31 in FIG. 7. The triangular cutout is characterized by the quantities "a" and "d" as well as recess angle α. The following applies for the relationship of those quantities relative to each other:

$$\arctan\left(\frac{2 \cdot a}{d}\right) \leq \alpha \leq 90°$$

wherein $$0 \leq c \leq d; \frac{a}{d} = \frac{1}{4.3}; 0.1 \leq \frac{a}{d} \leq 1.$$

FIG. 12 shows various exemplary embodiments of configurations of the recess. The examples shown in FIGS. 12a to 12d show various configurations of the recess in the form of combined, equivalent, or different radii R, whereas the exemplary embodiment shown in FIG. 12e is a configuration of the recess 31 in the form of a portion of an ellipse. FIG. 12a shows an exemplary embodiment of the recess 31 in the form of a portion of a circle having a radius R. FIG. 12b shows an exemplary embodiment of the recess 31 in which two regions of the circular section identified by radius R are connected with each other by a straight segment 35. In the exemplary embodiment shown in FIG. 12c, a concave radius RV in the region of the centerline 32 abuts a convex radius RX on both sides. The radii RV and RX are arranged in relation to each other so that there is a smooth transition between the individual radii and between the radii and the straight sections. Similar to the transition from exemplary embodiment 12a to exemplary embodiment 12b, there is a straight section 35 in the area of the centerline 32 in the exemplary embodiment in FIG. 12d. FIG. 12e shows an exemplary embodiment in which the recess 31 is in the form of a portion of an ellipse and hence has the shape of an elliptical portion. In FIGS. 12a to 12e, the baseline 33 is shown as a dot-dashed line and is only provided with a reference numeral in FIG. 12e for the sake of clarity.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate for a rocker joint chain, said plate comprising: two longitudinal legs and two vertical legs that together enclose a plate opening, wherein an outwardly-facing recess is formed in at least one of the longitudinal legs, wherein the recess includes a longitudinally-extending outer opening that extends along a baseline that lies along an outer surface of the at least one longitudinal leg, recess having a depth "a" relative to the baseline, and the at least one longitudinal leg having a depth "b" relative to the baseline, wherein the ratio $$0.1 \le \frac{a}{b} \le 0.5$$

applies, and wherein the at least one longitudinal leg that includes the recess has an outer surface that includes aligned linear surfaces at each longitudinal end of the recess outer opening.

2. A plate in accordance with claim 1, wherein the ratio $$\frac{a}{b} = \frac{1}{5}$$

applies.

3. A plate in accordance with claim 1, wherein the recess in a longitudinal profile of the plate is one of trapezoidal or rectangular cross-sectional form.

4. A plate in accordance with claim 1, wherein the at least one recess in the at least one longitudinal leg of the plate has the cross-sectional form of one of a substantially trapezoidal shape having rounded inner corners and a substantially rectangular shape having rounded inner corners.

5. A plate in accordance with claim 1, wherein the recess is formed by adjacent convex and concave curves that smoothly transition into each other and form one of a trapezoidal recess and a rectangular recess.

6. A plate in accordance with claim 5, wherein concave curves joined by a section of a straight line are on both sides of an axis of symmetry passing through the recess and perpendicular to a plate longitudinal axis.

7. A plate in accordance with claim 5, wherein the convex and concave curves are each circular arcs.

8. A plate in accordance with claim 7, wherein the circular arcs have equal radii.

9. A plate in accordance with claim 1, wherein the recess in the at least one longitudinal leg of the plate has the cross-sectional shape of a portion of a circle.

10. A plate in accordance with claim 1, wherein the recess in the at least one longitudinal leg of the plate has the cross-sectional shape of a portion of an ellipse.

11. A plate in accordance with claim 1, wherein the recess is substantially in the center of the plate with reference to a centerline of the plate that is perpendicular to a plate longitudinal axis.

12. A plate in accordance with claim 1, wherein a plurality of recesses are formed in a single longitudinal leg.

13. A plate in accordance with claim 12, wherein the recesses are symmetrical relative to a centerline of the plate that is perpendicular to a plate longitudinal axis.

14. A rocker joint chain comprising a plurality of plates in claim 1.

15. A variable speed drive transmission including a rocker joint chain in accordance with claim 14, wherein the recesses in the plates are on a side of the plates that are guided along a guideway of a guide rail during operation of the transmission.

* * * * *